Patented Oct. 25, 1938

2,134,276

UNITED STATES PATENT OFFICE 2,134,276

PREPARATION OF SELF-FILTERING GROUND COFFEE

Arthur Roscher and Franz von Herrenburger, Dresden, Germany, assignors to the firm R. Seelig & Hille, Dresden, Germany No Drawing. Application April 7, 1937, Serial No. 135,530. In Germany May 14, 1936

5 Claims. (Cl. 99—65)

This invention relates to a process of preparing ground coffee that is self-filtering and ready for infusion in bags having relatively large pores.

The invention attains its object by first separating the coarsely granular portion of ground coffee from the mealy portion thereof and then adding to each portion a bassorin-containing gum, such as cherry or tragacanth gum, combined with a sugar solution. To effect granulation of the mealy portion a larger amount of gum is added thereto than to the granular portion. Both portions are then mixed.

It is known to treat the mealy portion of ground roasted coffee after its separation from the coarse-grained portion with a gum solution containing for instance sugar, gum arabic or acacia gum. These substances are, however, soluble in water, but bassorin-containing gum added to the ground coffee according to the invention swells up in water and thus renders it self-filtering, whilst in accordance with the known processes it is desirable to bring the coffee dust into the infusion.

Although it is known to use tragacanth gum in the production of candy and lozenges as granulating substance in combination with coffee meal, this gum has not been employed hitherto for the purpose of preparing coffee ready for infusion. It was not obvious to apply the water insoluble substance used for the known purposes stated to ground coffee in order to influence the filtrability thereof in so favorable a manner that the extracting property is unimpaired and the fine particles of the ground coffee are retained in the filtering bag.

The effect attained is all the more surprising as just in coffee treatment great efforts are made to emulsify the insoluble coffee particles in the infusion with the aid of gum-like vegetable products.

The following proportional amounts have for instance been found to give favorable results:

Example

To 100 parts by weight of ground coffee that is either pure or contains permissible flavoring matter 2.5 parts by weight of a 50 per cent. sugar solution and 2 parts by weight of a 5 per cent. bassorin-containing gum solution are added.

Owing to this addition, the ground coffee is coated with a thin preserving film which closes the pores of the coffee particles, granulates the mealy matter and prevents evaporation of the aromatic substances.

The addition of gum and sugar, on coming in contact with boiling water during infusion, renders the coffee self-filtering, binds the developing slime and owing to its colloidal action retains it in the bag or strainer.

The process according to the invention is of course applicable also to coffee substitutes, made from barley, malt, etc.

We claim:—

1. Process for preparing infusible self-filtering coffee, which consists of the step of treating ground coffee with a water insoluble, sugary and bassorin-containing solution of gum.

2. Process according to claim 1, in which the coarse-grained and the mealy portions of ground coffee are subjected to separate treatment and are thereafter mixed.

3. Process according to claim 1, consisting in adding to 100 parts by weight of ground coffee 2.5 parts by weight of a 50 per cent. sugar solution and 2 parts by weight of a 5 per cent. bassorin-containing gum solution.

4. Process according to claim 1, consisting in adding to 100 parts by weight of ground coffee mixed with permissible flavoring matter 2.5 parts by weight of a 50 per cent. sugar solution and 2 parts by weight of a 5 per cent. bassorin-containing gum solution.

5. Process according to claim 1, in which the ground coffee after treatment is placed in infusion bags having large perforations.

ARTHUR ROSCHER.
FRANZ VON HERRENBURGER.